United States Patent [19]

Lescaut

[11] Patent Number: 4,753,368
[45] Date of Patent: Jun. 28, 1988

[54] METALLOPLASTIC COMPOSITE CONTAINERS

[75] Inventor: Pierre L. Lescaut, Bernay, France

[73] Assignee: Atochem, France

[21] Appl. No.: 934,163

[22] Filed: Nov. 24, 1986

[30] Foreign Application Priority Data

Nov. 26, 1985 [FR] France ................................ 85 17475

[51] Int. Cl.$^4$ ............................................... H05B 3/00
[52] U.S. Cl. .................... 220/454; 220/5 A; 220/DIG. 29; 220/457; 220/67; 220/75
[58] Field of Search ............... 220/454, 457, 458, 456, 220/461, 462, 470, 5 R, 5 A, 1 B, 4 B, 4 E, DIG. 29, 67, 75; 29/458, 460, 463

[56] References Cited

U.S. PATENT DOCUMENTS

| | | | |
|---|---|---|---|
| 1,748,138 | 2/1930 | McBride | 220/5 A |
| 2,145,937 | 2/1939 | Lockwood | 220/DIG. 29 X |
| 2,263,021 | 11/1941 | Uecker | 220/DIG. 29 X |
| 2,302,563 | 11/1942 | Masters | 220/75 X |
| 2,592,419 | 4/1952 | Harper et al. | 220/5 A |
| 2,993,617 | 7/1961 | Briggs | 220/67 X |
| 3,115,987 | 12/1963 | Barnstead | 220/457 |
| 3,268,344 | 8/1966 | Kamm | 220/458 X |

Primary Examiner—Steven M. Pollard
Attorney, Agent, or Firm—Sigalos & Levine

[57] ABSTRACT

The present invention comprises composite metallic containers comprising a plurality of metallic elements assembled by welding, said container having mating end elements having abutting flanges forming joints and end walls extending away from said flanges at an angle; the ends of each flange being bevelled toward the interior of each said joint at an angle between about 45° to 60° from the horizontal line of each said joint so as to form a groove at said joint ends, a stainless metallic layer of a thickness of about 200 to 600 microns on each of said flanges and extending therefrom at least a portion along the interior of said end walls, an anti-corrosion layer consisting essentially of a thermoplastic or thermosetting resin on the interior of each said metallic elements with said layer overlapping said metallic layers on said end walls over a length of at least about 10 mm and at least about 15 mm from where the welding of the end elements takes place, and a stainless metallic alloy bead welded in each of said grooves in said joint ends.

5 Claims, 1 Drawing Sheet

METALLOPLASTIC COMPOSITE CONTAINERS

BACKGROUND OF THE INVENTION

The present invention is directed to the assembly by autogenic welding of containers constituted of at least two elements or pieces; the containers being of the type of storage devices or reactors used by the chemical agrichemical, food, pharmaceutical and the like industries.

The fluids stored, transported or treated in these containers are understood in the most general manner to be materials such as aqueous solutions, organic solutions, washing compounds, suspensions or emulsions and the like.

The containers adapted to be used for such storage, transport or treatment are generally made of steel and customarily receive protective coatings or linings such as sintered glass linings, enamels or varnishes baked in the furnace such as varnish based on epoxy resins or polyurethane resins and the like. They can likewise be made of stainless steel and in that case do not have a coating.

The containers in question are limited in their shape, it being understood that the thermal susceptibility of the coatings cited above prohibits their manufacture in several pieces and subsequent assembly by the autogenic welding or soldering of the constituent pieces made of steel.

Furthermore, the containers obtained by brazing from sheets of stainless steel are very costly.

SUMMARY OF THE INVENTION

The goal of the present invention is to remedy these drawbacks and limitations in a simple manner and inexpensive manner.

Briefly, the present invention comprises composite metallic containers comprising a plurality of metallic elements assembled by welding, said container having mating metallic end elements having abutting flanges forming joints and end walls extending away from said flanges at an angle; the ends of each flange being bevelled toward the interior of the joint at an angle between about 45° to 60° from the horizontal line of said joint so as to form grooves at said joint ends, a stainless metallic layer of a thickness of about 200 to 600 microns on each of said flanges and extending therefrom at least a portion along the interior of said end walls, an anti-corrosion layer consisting essentially of a thermoplastic or thermosetting resin on the interior of each said metallic elements with said layer overlapping said metallic layers on said end walls over a length of at least about 10 mm and at least about 15 mm from where the welding of the end elements takes place, and a stainless metallic alloy bead welded in each of said grooves in said joint ends.

DETAILED DESCRIPTION

The first phase of the process consists of depositing by Schoop's metal spraying process; a procedure by which in such technology is understood to mean the application by oxyacetylene blowtorch of a metal introduced in the form of a continuous wire to the blowtorch on the plane supporting surfaces or projecting flanges of the container elements to be assembled, of a stainless metallic alloy constituted of iron and one of the metals of the chromium, nickel, cobalt group.

In a variation of the process, the stainless metallic alloy is introduced to the blowtorch in the form of a powder and, besides the metals cited, contains silicon carbide.

The thickness of the alloy deposited varies depending on the applications to be made of the final container, but is usually about 200 to 600 microns. The external edges of the flanges to be assembled are advantageously bevelled to an angle between 45° and 60° with respect to the assembly plane.

Not only the flanges to be assembled, but, also, the bevelled edges of the sheet metal of the container element thus receive a metallization such as described above.

It has been found to be advantageous to extend this metallization towards the interior of the flanged container element, beyond the connection radius of the flanges.

During the course of a second phase of the process an anti-corrosion coating is deposited on the internal surfaces of the container elements to be assembled. It is composed of thermoplastic resins selected from polyamids, fluorinated resins, polyethylenes (preferably of high molecular weight) or polyvinyl chlorides. This coating can likewise be composed of thermosetting resins selected from epoxy resins or polyurethanes.

These various thermoplastic resins are advantageously applied using fine powders of a granulometry between 10 and 400 microns and by known processes such as electrostatic precipitation, wetting, or use of a spray gun. Depending on the particular use, the thickness of this coating can vary from 200 microns to 5 mm.

No anti-corrosion coating is placed on the flanges of the elements to be assembled on which the stainless metallic alloy was deposited during the first phase. However, the anti-corrosion coating applied in the second phase is such that it must always cover the stainless metallic deposit on the end walls in such a way as to ensure the continuity of the protection of the interior of the container obtained.

For reasons of safety and industrial fabrication tolerance, the zone of covering (where the two coatings overlap) must not be less than 10 mm.

The creation of openings in the container for various uses and welding of pipes, nozzles, tubes, or other devices to the container requires that such be treated in the same manner as described in making the container. Also, cylinder sections can be welded to the end pieces in the same manner.

The invention will be further described in connection with the drawings.

Figure 1:
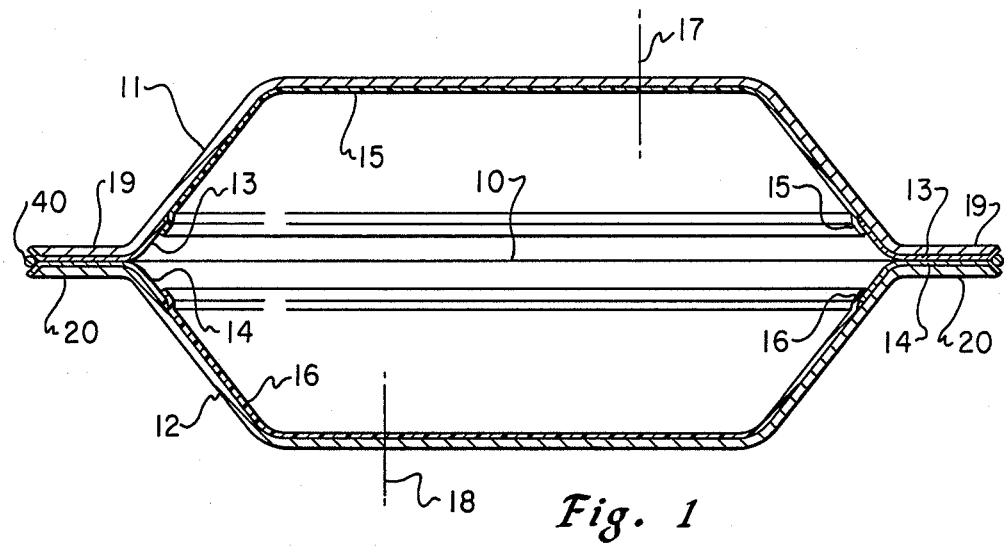
FIG. 1 is a cross-sectional of a container of the present invention formed of two identically shaped metal shells.

Referring to FIG. 1, a container according to the invention is composed of two shells 11 and 12 supported on one another by projecting flanges along joint plane 10. Using Schoop's metal spraying procedure flanges 19 and 20 receive metallization layers 13 and 14 based on a stainless composition on all of the interior surfaces of flanges 19 and 20 as well as on a portion of the end walls of shells 11 and 12.

A layer of anti-corrosion covering 15 and 16 based on thermoplastic resins selected from polyamides, fluorinated resins, polyethylenes or PVC, or thermosetting resins, such as epoxy resins or polyurethanes, is applied to the interior of shells 11 and 12.

These two types of resins are heat sensitive, the first because they melt at their fusion temperature before decomposing, the second because they undergo a decomposition.

The object of the present invention is to protect the heat-sensitive anti-corrosion coating from decomposition, by stopping it at least at 15 mm from the zone where one proceeds with the autogenic welding of flanges 19 and 20 of shells 11 and 12 to be assembled.

This autogenic welding is carried out by the melting of a stainless metallic alloy wire of the same composition as layers 13 and 14 deposited on flanges 19 and 20 to be assembled. The outer ends of flanges 19 and 20 are advantageously bevelled towards the inside of the finished container by an angle between 45° and 60° to the horizontal line of the joint plane, thus forming a groove to receive the metal weld bead 40.

Since the finished container is to serve as a tank, it is necessary to provide various openings for fitting tubes, pipes or the like thereto as at 17 and 18. The metal of these tubes will be metallized by a stainless composition on its internal face and its end face and besides will receive an anti-corrosion coating according to the same principle as the one set forth above; namely, that the heat-sensitive anti-corrosion coating is interrupted at least 15 mm from the end face to be assembled by autogenic welding, and that this coating overlaps the stainless metallic layer over a length of at least 10 mm.

Figure 2:
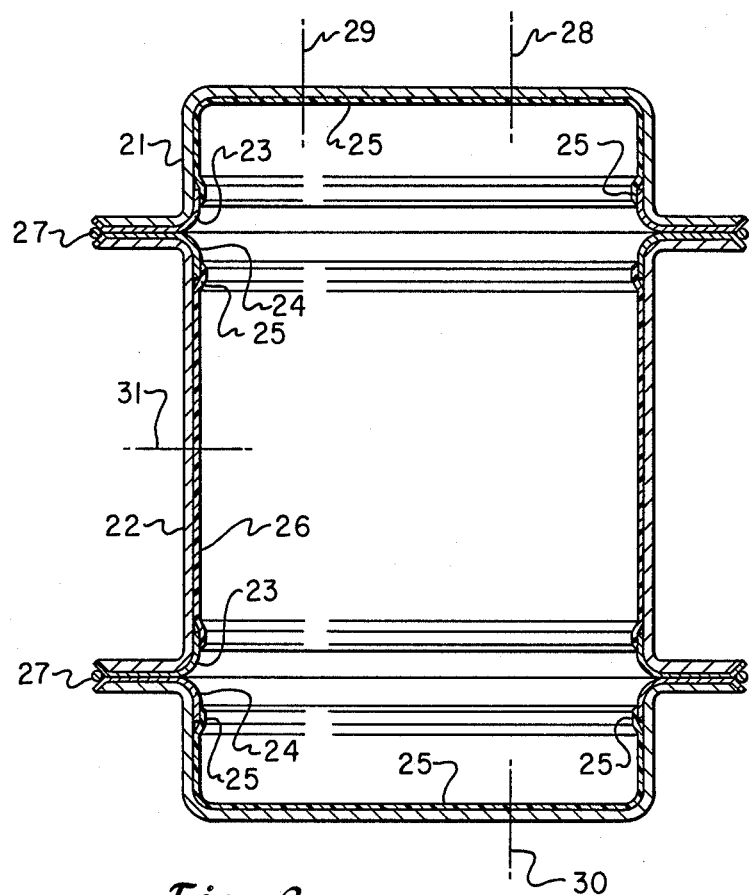
FIG. 2 is a cross-sectional view of a container formed of three metal elements.

FIG. 2 represents a variation of the type of containers possible to be produced by the instant process. The container comprises three constitutive elements; two shells 21 similar to the shells of the preceding example, assembled on the two open extremities equipped with the flanges with a flanged cylinder sleeve 22 by autogenic welding with the help of stainless metallic wire 27.

The metallized supporting surfaces of the various constitutive elements 23 and 24 are overlapped by the heat-sensitive anti-corrosion coatings 25 and 26.

Connecting tubes, pipes and the like can be placed at different sites of the finished container as at 28, 29, 30, and/or 31 by utilizing the same technique as previously described.

The containers corresponding to FIG. 1 can be all types of flat tanks such as, for instance, fuel tanks for automobiles.

The containers corresponding to FIG. 2 can be reactors of the type employed in the chemist industry, or in the processing of pharmaceuticals or foods.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A composite metallic container comprising a plurality of metallic elements assembled by welding, said container having mating end elements having abutting flanges forming joints and end walls extending away from said flanges at an angle; the ends of each flange being bevelled toward the interior of each said joint at an angle between about 45° to 60° from the horizontal line of each said joint so as to form a groove at said joint ends, a stainless metallic layer of a thickness of about 200 to 600 microns on each of said flanges and extending therefrom at least a portion along the interior of said end walls, an anti-corrosion layer consisting essentially of a thermoplastic or thermosetting resin on the interior of each said metallic elements with said layer overlapping said metallic layers on said end walls over a length of at least about 10 mm and at least about 15 mm from where the welding of the end elements takes place, and a stainless metallic alloy bead welded in each of said grooves in said joint ends.

2. The composite metallic container of claim 1, wherein the container consists of two flanged metal shells adapted to abut at their flanges to form a container and provided with inlet and outlet means.

3. The composite metallic container of claim 2 including at least one metal cylindrical element having flanges at each end thereof interposed between said two flanged metal shells; the flanges of said metal cylindrical element adapted to abut the respective flanges of said two flanged metal shells and said at least one metal cylindrical element being coated on the interior of its flanges and interior walls surfaces with said stainless metallic layer and anti-corrosion layer in the same manner as said two flanged metal shells.

4. The composite metallic container of claim 1, 2, or 3, wherein the stainless metallic layer is composed of an alloy of iron and of one of the metals of the chromium, nickel, cobalt group, and optionally silicon carbide.

5. The composite metallic container of claim 1, 2, or 3, wherein the heat-sensitive anti-corrosion layer consists of a thermoplastic resin selected from polyamides, fluorinated resins, polyethylenes, or polyvinyl chlorides or of a thermosetting resin selected from epoxy resins or polyurethanes.

* * * * *